(12) United States Patent
Davis et al.

(10) Patent No.: US 8,816,649 B2
(45) Date of Patent: Aug. 26, 2014

(54) SYSTEMS AND METHODS FOR CHARGING USING A PERMITTED CHARGING CURRENT

(75) Inventors: Roy J. Davis, Rowlett, TX (US); Paul Smith, Denton, TX (US); Richard H. Hock, Farmersville, TX (US)

(73) Assignee: General Electric Company, Schenectady, NY (US)

( * ) Notice: Subject to any disclaimer, the term of this patent is extended or adjusted under 35 U.S.C. 154(b) by 328 days.

(21) Appl. No.: 13/086,031

(22) Filed: Apr. 13, 2011

(65) Prior Publication Data

US 2011/0187331 A1      Aug. 4, 2011

Related U.S. Application Data

(63) Continuation-in-part of application No. 12/965,501, filed on Dec. 10, 2010.

(60) Provisional application No. 61/287,322, filed on Dec. 17, 2009.

(51) Int. Cl.
*H02J 7/04* (2006.01)
*H02J 7/16* (2006.01)

(52) U.S. Cl.
CPC ..................... *H02J 7/04* (2013.01)
USPC ........................................................ 320/162

(58) Field of Classification Search
USPC ......................................................... 320/162
See application file for complete search history.

(56) References Cited

U.S. PATENT DOCUMENTS

| | | | |
|---|---|---|---|
| 5,570,002 A * | 10/1996 | Castleman | 323/283 |
| 6,295,216 B1 | 9/2001 | Faria et al. | |
| 6,452,364 B1 * | 9/2002 | Saeki et al. | 320/137 |
| 6,605,879 B2 | 8/2003 | Wade et al. | |
| 6,738,692 B2 | 5/2004 | Schienbein et al. | |
| 6,753,622 B2 | 6/2004 | Oughton, Jr. | |
| 6,917,124 B2 | 7/2005 | Shetler et al. | |
| 7,535,201 B2 | 5/2009 | Nakazawa | |
| 7,759,822 B2 | 7/2010 | Okui | |
| 7,868,483 B2 | 1/2011 | Lu et al. | |
| 8,227,937 B2 | 7/2012 | Barlock et al. | |
| 2001/0052760 A1 * | 12/2001 | Amano et al. | 320/163 |
| 2008/0084185 A1 | 4/2008 | Nakazawa | |
| 2008/0272739 A1 * | 11/2008 | Carrier et al. | 320/134 |
| 2009/0091300 A1 * | 4/2009 | Radke et al. | 320/163 |
| 2010/0049457 A1 | 2/2010 | Mutabdzija et al. | |
| 2010/0164289 A1 | 7/2010 | Umminger et al. | |

OTHER PUBLICATIONS

Issue 10 Feb. 2008; System Description 2-1; Galaxy Power System 4848/100 with 595 Series Rectifiers S1:3 and later; 6 pages.

Related Case; U.S. Appl. No. 12/965,501 to Davis; "A Hybrid Architecture for DC Power Plants and a Method of Minimizing Battery Conductor Current" Filed on Dec. 10, 2010.

* cited by examiner

*Primary Examiner* — Arun Williams
(74) *Attorney, Agent, or Firm* — General Electric Company

(57) ABSTRACT

Included herein is a DC power plant, a DC power system, a method charging a remote battery system and a battery charging controller. In one embodiment, the DC power plant includes: (1) a rectifier system including an AC power input and a DC power output, the rectifier system configured to receive an AC input voltage at the AC power input and produce a DC output voltage at the DC power output and (2) a controller configured to determine a permitted charging current for a remote battery system coupled to the rectifier system and dynamically adjust the DC output voltage to provide the permitted charging current for the remote battery system.

20 Claims, 5 Drawing Sheets

SYSTEMS AND METHODS FOR CHARGING USING A PERMITTED CHARGING CURRENT

CROSS REFERENCE TO RELATED APPLICATION

The present application is a continuation-in-part of U.S. patent application Ser. No. 12/965,501 by Davis, et al., filed on Dec. 10, 2010, entitled "Hybrid Architecture For DC Power Plants and A Method Of Minimizing Battery Conductor Current," which is incorporated herein by reference and claims priority based on U.S. Provisional Patent Application Ser. No. 61/287,322, filed by Davis, et al., on Dec. 17, 2009, entitled "Hybrid Power Architecture for DC Power Plants," commonly owned herewith and incorporated herein by reference.

TECHNICAL FIELD OF THE INVENTION

The invention is related, in general, to electrical power sources, and, more specifically to DC power plants for providing power to telecommunication systems.

BACKGROUND OF THE INVENTION

Telecommunication and data switching systems are used to route tens of thousands of calls and data connections per second. The failure of such a system, due to either an equipment breakdown or a loss of power, is generally unacceptable since it would result in a loss of millions of voice and data communications along with its corresponding revenue. The traditionally high reliability of telecommunication systems, that users have come to expect, is partially based on the use of redundant equipment including power supplies.

DC Power plants are used in the telecommunications industry to provide large amounts of DC power to critical loads and insure un-interrupted operation through the use of batteries or other energy storage media. DC Power plants typically include rectifiers that receive and rectify AC power to produce DC power for powering external equipment (i.e., loads) during normal operation. When an AC source is unable to provide power for the rectifiers to produce DC power for the loads, DC power plants can utilize the batteries as back-up to provide DC power for the equipment.

SUMMARY OF THE INVENTION

This disclosure provides a DC power plant. In one embodiment, the DC power plant includes: (1) a rectifier system including an AC power input and a DC power output, the rectifier system configured to receive an AC input voltage at the AC power input and produce a DC output voltage at the DC power output and (2) a controller configured to determine a permitted charging current for a remote battery system coupled to the rectifier system and dynamically adjust the DC output voltage to provide the permitted charging current for the remote battery system.

In another aspect, a DC power system is disclosed. In one embodiment, the DC power system includes: (1) a DC power bus, (2) a battery system coupled to the DC power bus, (3) primary DC distribution interrupting devices coupled to the DC power bus, (4) a power plant coupled to the DC power bus through the primary DC distribution interrupting devices, the power plant located remotely from the DC power bus and the battery system and (5) a controller configured to receive an indication the battery system needs charging current and direct the power plant to provide at least a portion of the charging current based on a permitted charging current of the power plant.

In still another aspect, a method of reducing a battery current associated with a rectifier system of a DC power plant is disclosed. In one embodiment, the method includes: (1) receiving a sensed current from a location on a battery distribution conductor connecting the DC power plant to a remote battery system and (2) dynamically adjusting a DC output voltage of the DC power plant based on the sensed current to reduce the battery current to substantially zero amperes.

In yet another aspect, a method of charging a remote battery system is disclosed. In one embodiment, the method includes: (1) receiving at a DC power plant a signal indicating charging current is needed for a remote battery system, (2) determining a permitted charging current for the DC power plant and (3) providing at least part of the charging current to the remote battery system from the permitted charging current.

In yet still another aspect, the disclosure provides a battery charging controller. In one embodiment, the battery charging controller includes: (1) an interface configured to receive a signal indicating a need for charging current for a battery system and (2) a processor configured to direct at least one power plant located remotely from the battery system to provide at least a portion of the charging current based on a permitted charging current of the at least one power plant.

BRIEF DESCRIPTION OF THE DRAWINGS

For a more complete understanding of the disclosure, reference is now made to the following descriptions taken in conjunction with the accompanying drawings, in which.

DETAILED DESCRIPTION

Figure 1:
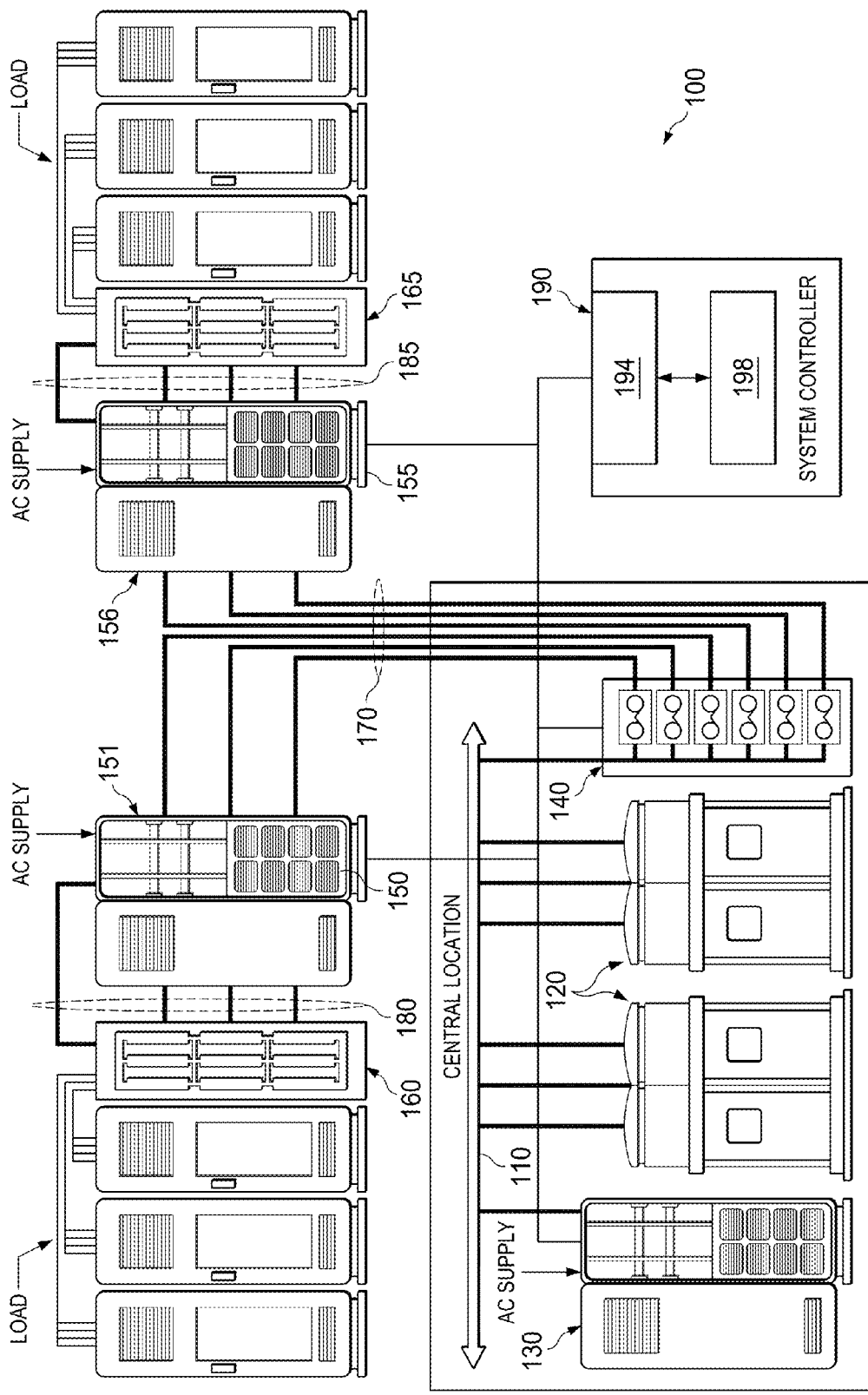
FIG. 1 illustrates a system diagram of an embodiment of a DC power system constructed according to the principles of the disclosure.

DC power systems may be structured in different configurations. In a centralized architecture, the power plants and batteries are positioned at a central location. Often, this may be the basement of a central office of a telecommunications company. DC power is then provided through battery distribution conductors to loads, such as telecommunications equipment, that are remotely located from the central location. As a result of high currents flowing in the long cables or other types of battery distribution conductors, DC losses associated with the remote location of the power plants to the loads can occur. In a distributed architecture, batteries and power plants are split into smaller units and positioned proximate the loads. While this may reduce the DC losses, the distributed architecture can be costlier due to the cost of suitable batteries with chemistry compatible with load equipment co-location.

The present disclosure provides a DC power system that allows centrally located batteries and also reduces DC losses associated with battery distribution conductors between the centrally located batteries and distal loads. The disclosed DC power system advantageously employs cost efficient battery technology that can be centrally located with DC power plants that can be co-located with the load equipment to provide DC efficiency. Thus, the disclosed DC power systems include the disclosed DC power plants that are placed close to load equipment, eliminating or at least reducing the resistive losses associated with the long battery distribution conductors from the central power plant. As such, when employing the DC power plants the central located batteries may only incur or essentially incur loss from the battery distribution conductors when in discharge mode. One skilled in the art will understand that in addition to the DC power plants, a DC power system may also include one or more centrally located power plants such as employed in a centralized architecture. As such, the disclosed DC power system can be incorporated with existing centralized architectures.

The disclosed DC power plant includes a rectifier system (i.e., a rectifier or rectifiers) that receives an AC input voltage and produces a DC output voltage. Additionally, the DC power plant includes a controller that monitors and controls the operation of the rectifier system and reduces battery current during normal operation between the DC power plant and the distal batteries that are centrally located. The individual DC power plants that are powering the loads are equipped with a battery current elimination feature to reduce the current flowing from the DC power plants to the batteries to substantially zero (which includes zero) during normal operation. In one embodiment, this is achieved by monitoring the battery current using a traditional resistance current shunt, and dynamically adjusting the DC power plant voltage to force the current to zero amperes. This occurs when the voltages on either side of the shunt are the same. Instead of using the resistance from the shunt, the resistance of the battery distribution conductor may also be used. Reducing the current flowing in the battery distribution conductors insures that there are minimal losses in these conductors during normal operation and also enables the battery charging power plant to optimize the battery charging voltage.

In a disclosed embodiment, a battery charger is located proximate with the batteries and is dedicated to charge the centrally located batteries. The battery charger can be sized and optimized to provide battery charging current for the battery system. In this embodiment, the remotely located DC power plants do not have to be used to charge the battery system. Accordingly, in some embodiments the distributed DC power plants may not have to cooperate to provide the optimum charging current for the battery system that is remotely located from the DC power plants. When the distributed DC power plants are not used for charging the battery system, DC losses are not incurred over the battery distribution conductors during the charging process. Instead, the battery charger that is proximate the batteries can be dedicated just for charging allowing the battery charger to be optimized for providing battery charging current for the battery system In some embodiments, a DC power plant or multiple DC power plants may be used to provide a charging current for the distal batteries. As such, this disclosure describes features that can be offered that utilizes the same hybrid architecture, battery conductor monitoring, and controllers to provide redundant and/or augmented controlled charging of a centrally located battery plant under specified circumstances by utilizing excess capacity in the DC power plants. If the battery charger in the centrally located battery plant fails or cannot deliver sufficient recharge current, a battery charging controller can adjust the output voltage of connected DC power plants to provide recharge current to the distal battery system through the battery conductors utilizing the battery conductor monitoring capability. The battery charging controller may be a system controller for the battery plant or a DC power plant controller. Multiple battery charging controllers may cooperate to provide the charging current for the battery system.

In one embodiment, the DC power plants may provide recharge or charging current based on the capacity and current loading of each DC power plant. This can be maintained until the battery charger for the battery system, if available, is brought back online or the recharge has been completed. Thus the excess capacity of a DC power plant or plants may be utilized to recharge or charge a centralized battery and still maintain capacity to serve its load.

In an embodiment where the Hybrid DC Power System does not include a centrally located battery charger, the DC power plants may be relied upon to provide charging or recharging current. A controller in the DC power plants may be configured as a battery charging controller to monitor the battery voltage of the battery system using the current sensing circuitry and adjust the output voltage to charge the distal battery system. In the event there is more than one DC power plant remotely located from the battery system, the controllers of these plants may be configured to cooperate so that the correct battery float voltage is maintained for the battery system. Since the currents necessary to maintain a float voltage are relatively small compared to the currents that flow during a discharge event, the sensing from the DC power plants can accurately measure the central battery float voltage. With multiple DC power plants, charging redundancy for the battery system is provided since each DC power plant may be able to provide charging current.

As discussed in more detail below, the disclosed DC power system architecture moves rectifiers closer to loads, preserves existing battery room investments, avoids the costs of re-cabling a DC infrastructure while maintaining a low risk battery location and minimizes DC operating losses. Additionally, DC output voltage of the disclosed DC power plants can be dynamically controlled to reduce current on battery distribution conductors to zero and minimize losses. A battery charger can also be dedicated to charging the centrally located battery system allowing an optimized voltage being set for charging or allowing the utilization of battery charging algorithms. Furthermore, DC power plants may be employed to provide charging current for the battery system as back-up to the battery charger or to provide charging current if there is no dedicated battery charger.

FIG. 1 illustrates a system diagram of an embodiment of a DC power system 100 constructed according to the principles of the disclosure. The DC power system 100 includes a DC power bus 110, a battery system 120, a battery charger 130, primary DC distribution interrupting devices 140, DC power plants 150 and 155, DC power distribution centers 160 and 165, battery distribution conductors 170 and DC distribution connections 180, 185. Additionally, the DC power system 100 may include a system controller 190.

The DC power bus 110 may be a conventional DC bus that is used in a DC power system having a centralized architecture. The battery system 120 and the primary DC distribution interrupting devices 140 may also be conventional devices that are used in conventional centralized architecture DC power systems. The battery system 120, for example, may be conventional lead acid batteries. In other embodiments, the battery system 120 may include another type of battery used for storing energy. The primary DC distribution interrupting devices 140 may be conventional DC switches. In other embodiments, the primary DC distribution interrupting devices 140 may be another type of device for interrupting DC load such as a circuit breaker or a fuse.

The DC power bus 110, the battery system 120 and the primary DC distribution interrupting devices 140 may all be located in a single location. For example, these devices may be centrally located in a basement or single room. In some embodiments, the DC power bus 110, the battery system 120 and the primary DC distribution interrupting devices 140 may be centrally located in a central office of a telecommunications company.

The battery charger 130 may also be located proximate the DC power bus 110, the battery system 120 and the primary DC distribution interrupting devices 140 at a single location. The battery charger 130 receives AC power and generates DC power. As such, the battery charger 130 can provide a DC battery charging current. The AC power may be supplied from a commercial utility company or even an emergency AC source. The battery charger 130 is coupled to the DC power bus 110 and, therethrough provides a charging current for the battery system 120. The battery charger 130 may be a DC power plant that is specifically sized and designated to provide the battery with charging current for the battery system 120. As such, the battery charger 130 may include sufficient capacity (e.g., rectifiers) to produce the needed battery charging current for the battery system 120. With the DC power system 100, the battery charger 130 is not needed to provide DC power for loads. As such, in some embodiments the battery charger 130 can be sized only for generating the needed battery charging current for the battery system 120. The battery charger 130, along with the battery system 120 and the primary DC distribution interrupting devices 140 may be coupled to the DC power bus 110 via conventional connectors, cables or bus bar.

In some situations, the battery charger 130 may be of inadequate size to recharge the battery system 120 in adequate time. For example a load of the DC power system 100 may have increased and the battery charger 130 can not recharge the battery system 120 in a required time. The required time may be based on the loads, an industry standard or time established by an operator of the DC power system. The operator of the DC power system 100 may not be able to install a larger battery charger or the operator may choose to avoid the additional cost. As such, excess capacity in the DC power plants 150 and 155 may be used to provide an additional charging current for the battery system 120 and obtain the desired recharge time or capability.

With the hybrid architecture of the DC power system 100, additional charging capacity from the distributed DC power plants 150, 155 may also be used to provide recharging redundancy in the event the battery charger 130 fails completely or can only provide a portion of its capacity. Although the hybrid architecture of the DC power system 100 may be used automatically to provide recharging from the DC power plants 150, 155, controllers associated with the DC power system 100, such as the system controller 190 or controllers of the DC power plants 150, 155, may be configured to control the amount of recharge current provided to the battery system 120 from the distal DC plants to insure a sufficient capacity is retained for the associated loads. The system controller 190 or controllers of the DC power plants 150, 155, may be configured to prioritize the amount of recharge current supplied to the battery system 120 by each distal DC power plant 150, 155, such that DC power plants with high priority (e.g., serve critical loads) may reserve their capacity and those with low priority loads may provide charging current up to full capacity.

The system controller 190 includes an interface 194 and a processor 198. The interface 194 may be a conventional port configured to receive signals such as a signal indicating a need for charging current for the battery system 120. The processor 198 may be configured to direct at least one power plant, such as DC power plant 150 or 155, to provide at least a portion of a charging current for the battery system 120 based on a permitted charging current of the DC power plant 150, 155. The system controller 190 or the controllers of the DC power plants may be configured as battery charging controllers. As such, the controllers of the DC power plants 150, 155, may also include an interface and processor as in the system controller 190.

The battery distribution conductors 170 may be battery distribution cables, bus bars or other current carrying components that may be typically used in a DC power system having a centralized architecture. The battery distribution conductors 170 electrically couple the DC power plants 150, 155, to the primary DC distribution interrupting devices 140. The battery distribution conductors 170 are sized to provide DC power to loads when the AC power supply is unavailable for the DC power plants 150, 155. The size of the battery distribution conductors 170, therefore, may vary depending on the needed capacity and the distance between the primary DC distribution interrupting devices 140 and the DC power plants 150, 155, which are located proximate to the loads.

Figure 2:
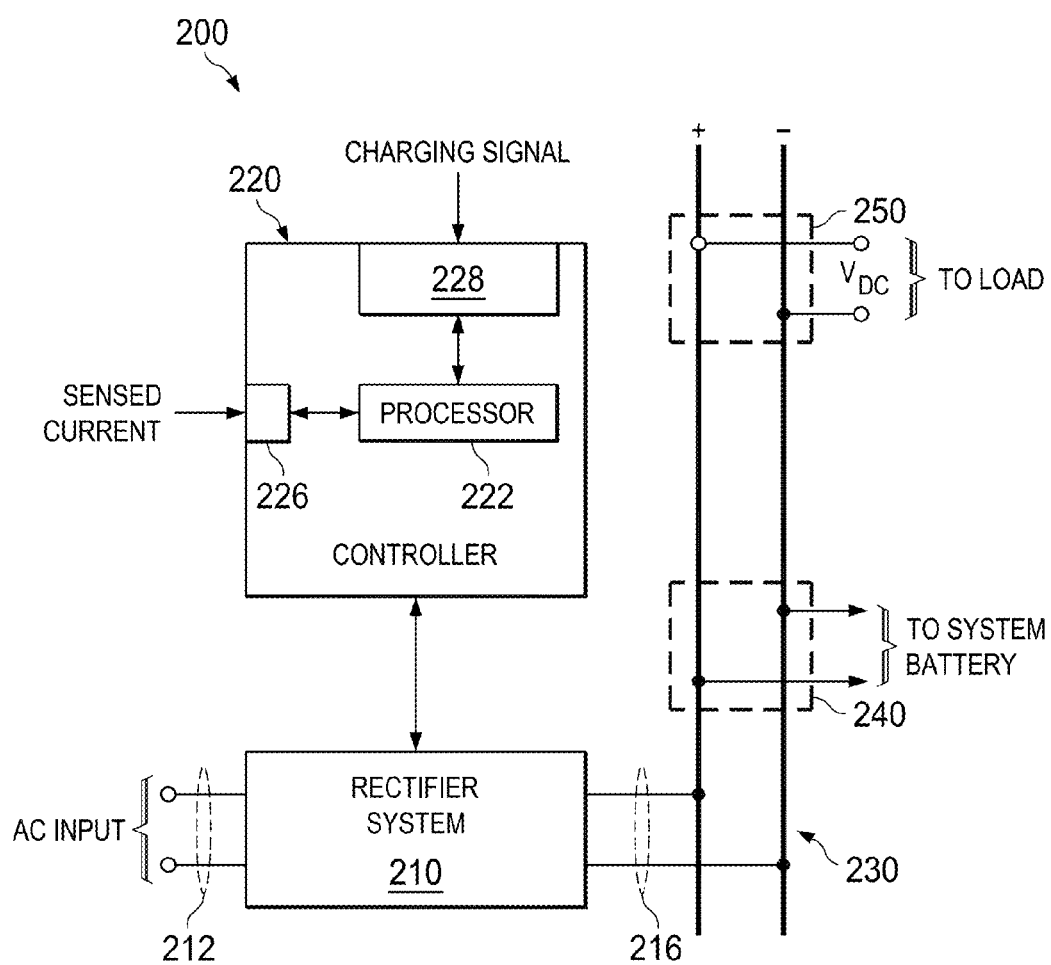
FIG. 2 illustrates a block diagram of an embodiment of a DC power plant constructed according to the principles of the disclosure.

The DC power plants 150, 155, receive AC power and produce DC power. The DC power plants 150, 155, include a rectifier system that receives the AC power and generates the DC power. However, the DC power plants 150, 155, do not include a battery for storing the generated DC power. The rectifier system may be a conventional rectifier or rectifiers. The DC power plants 150, 155, also include controllers that monitor and direct the operation of the rectifier systems. The controllers and rectifier systems are not denoted in FIG. 1 but are illustrated in FIG. 2 and correspondingly discussed below. The DC power plants 150, 155, may be located in cabinets 151, 156.

During normal operation (i.e., when there is AC power and the rectifier system is producing DC power therefrom) the DC power plants 150, 155, provide DC for the loads. As such, the battery system 120 is not discharging or in a discharge mode. The DC power is provided to the loads from the DC power plants 150, 155, via the DC distribution connections 180, 185, and the power distribution centers 160, 165. The DC distribution connections 180, 185, may be conventional cables or bus for transmitting DC power. Additionally, the power distribution centers 160, 165, may be conventional devices used to provide secondary fusing, switching or circuit breaking for DC power delivered to equipment. The power distribution centers 160, 165, can provide battery redundancy to the loads through the use of multiple load buses. In one embodiment, either of the power distribution centers 160, 165, may be a Battery Distribution Fuse Bay (BDFB) available from Lineage Power Corporation of Plano, Tex. In other embodiments, either of the power distribution centers 160, 165, may be a Battery Distribution Circuit Breaker Bay (BDCBB) available from Lineage Power Corporation.

As illustrated, the battery distribution conductors 170 may also provide redundancy between the DC power bus 110 and the DC power plants 150, 155. During normal operation, the battery distribution conductors 170 do not need to provide DC power to the loads since this is handled by the DC power plants 150, 155. Accordingly, to prevent battery current on the battery distribution conductors 170 during normal operation, the controller is configured to monitor the battery current (i.e., distal battery current) on the battery distribution conductors 170. The battery current on the battery distribution conductors 170 includes current generated by the rectifier system of the DC power plants 150, 155, via a DC bus of the DC power plants 150, 155. The controllers of the DC power plants 150, 155, dynamically adjust the DC output voltage from the rectifier systems to maintain the distal battery current at substantially zero amperes. The accuracy of measuring circuits or control circuits employed with the DC power system 100 may determine how close to zero amperes the distal battery current can be maintained. The controllers of the DC power plants 150, 155, may make these dynamic adjustments employing control techniques to minimize dither or oscillation, low frequency or otherwise, of the DC output voltage of the DC power plants 150, 155. Accordingly, the battery distribution conductors 170 may only incur resistive losses when in discharge mode (i.e., when the battery system 120 is providing DC power to the loads).

There are conditions when the battery system 120 may be discharged due to an AC outage and AC power has been just restored. Under normal operating procedures, the battery charger 130 will commence a recharge of the battery system 120 and the DC power system 100 may operate as heretofore described. However, there may be instances where a more rapid recharge of the battery system 120 is needed or desired than the battery charger 130 has capability to provide. Alternatively, the battery charger 130 may have failed. Accordingly, the system controller 190 may be configured to direct the DC power plants 150, 155, to assist in charging the battery system 120.

The system controller 190 may be a centralized controller for the DC power system 100 or a controller in the battery charger plant. The system controller 190 includes an interface 194 and a processor 198. The interface 194 may be a conventional port configured to receive signals such as a signal indicating a need for charging current for the battery system 120. The processor 198 may be configured to direct at least one power plant, such as DC power plant 150 or 155, to provide at least a portion of a charging current for the battery system 120 based on a permitted charging current of the DC power plant 150, 155.

The processor 198 may have a series of operating instructions stored thereon that direct the operation of the processor 198 when initiated thereby. The operating instructions may be software stored on hard drive or another permanent memory structure. The system controller 190 may be configured to signal one or more of the distal DC power plants 150, 155, to provide charging current to the battery system 120 via the battery distribution conductors 170. The system controller 190 may monitor the state of battery discharge and the overall battery charging current delivered by the battery charger 130 and the distal DC power plants 150, 155. Based on the monitoring information, the system controller 190 may be configured to issue commands, such as control signals to the DC power plants 150, 155, the battery charger 130 or the primary DC distribution interrupting devices 140, to control the charging of the battery system 120 from all or some of the distal sources.

An operating state determined by the system controller 190 may also initiate providing charging current for the battery system 120. The controllers of the DC power plants 150, 155 will then sense the load currents 180, 185, determine the reserve capability of the DC power plants 150, 155, based on their total capacity and dynamically adjust the DC output voltage of the DC power plants 150, 155, from the rectifier systems thereof to provide recharge current to the battery system 120 based on the sensed current in the battery distribution conductors 170.

The amount of recharge current supplied by the various sources may be determined by the system controller 190. The system controller 190 may have a maximum limit imposed for the various sources by an operator or operating entity of the DC power system 100 or may be programmed with maximum limits. For example, it may be predetermined that the DC power plants 150, 155, may not be loaded to more than 90% of their total capacity by the load and recharge current. This state may continue until the system controller 190 removes the recharge signal, or after a selected time period, or after the controllers of the DC power plants 150, 155, sense that the battery system 120 has been fully recharged. The system controller 190 or the controllers of the DC power plants may be configured as battery charging controllers. As such, the controllers of the DC power plants 150, 155, may also include an interface and processor as in the system controller 190 and perform the functions as described above.

FIG. 2 illustrates a block diagram of an embodiment of a DC power plant 200 constructed according to the principles of the disclosure. The DC power plant 200 includes a rectifier system 210, a controller 220, a DC bus 230, a remote battery connection 240 and a proximate load connection 250.

The rectifier system 210 includes an AC power input 212 and a DC power output 216. Coupled to the rectifier system 210 is the controller 220. The controller 220 is configured to monitor and manage the operation of the rectifier system 210. The controller 220 may also be configured to provide battery charging current from the DC power plant 200 to a remote battery system. As such, in some embodiments, the controller 220 may be configured to communicate with other DC power plants, a system controller of a DC power system including the battery system to recharge, a dedicated charger for the battery system or other components of the DC power system that may be employed to provide a charging current to the battery system. The controller 220 may communicate with the other equipment or components employing conventional communication signals and means. The controller 220 includes a processor 222, a current sensing interface 226 and a communications interface 228. The controller 220 may include additional components and interfaces that are typically included in a power plant controller.

The rectifier system 210 is configured to receive an AC input voltage at the AC power input 212 and produce a DC output voltage 216 at the DC power output 216. The rectifier system 210 may be a conventional AC to DC rectifier or rectifiers. In one embodiment, the DC output voltage 216 may be at +24 volts and −48 volts. Of course, in other embodiments, the DC output voltage may vary. Coupled to the DC power output is a DC bus 230. Connected to the DC bus 230 are a remote battery connection 240 and a proximate load connection 250. The DC bus 230 includes a positive bus and relative thereto, a negative bus. The DC bus 230 may be a typical DC bus included in a conventional power plant. The remote battery connection 240 is sufficiently sized to physically and electrically couple a battery distribution conductor to the DC bus 230. Unlike DC power plants that are located proximate to a central battery system (e.g., in a central architecture), the remote battery connection 240 is sized for the battery distribution conductor that connects the DC power plant 200 to a central battery system that is distal. In contrast, the DC power plant is located proximate a load instead of the battery system. As such, the proximate load connection 250 is sufficiently sized to physically and electrically connect DC distribution connections to the DC bus 230.

The processor 222 includes the necessary hardware and software to direct the operation of the DC power plant 200 including the rectifier system 210. For example, the processor 222 may be a digital data processor that is programmed or stores executable programs of sequences of software instructions to perform one or more of the described functions. The software instructions of such programs may be encoded in machine-executable form on conventional digital data storage media, e.g., magnetic or optical disks, random-access memory (RAM), magnetic hard disks, flash memories, and/or read-only memory (ROM), to enable various types of digital data processors or computers to perform one, multiple or all of the described functions of the controller 220. As such, the processor 222 is configured to monitor a distal battery current generated by the rectifier system 210 for a remote battery system and dynamically adjust the DC output voltage to maintain the distal battery current at substantially zero amperes. The distal battery current would be located on a battery distribution conductor connected to the DC bus 230 via a remote battery connection 240.

The processor 222 may be configured to dynamically adjust the DC output voltage based on the sensed current representing the distal battery current. As such, the processor 222 may generate control signals to direct the operation of the rectifier system 210. The controller 220 may receive the sensed current via the current sensing interface 226. The sensed current may represent the different sides of a resistance current shunt coupled to the battery distribution conductor. To reduce the battery current to substantially zero amperes, the processor 222 is configured to use the sensed current to determine the voltages on the two different sides of the resistor of the current shunt. The processor 222 is then configured to adjust the DC output voltage so that the two voltages match (i.e., are substantially the same). As such, the distal battery current is reduced to zero or substantially zero amperes.

The communications interface 228 may be a conventional communications port. The communications interface 228 is configured to receive a signal indicating a need for charging current for a battery system. The battery system may be the remote battery system. The signal may be received from, for example, a controller of the battery system, a battery charger for the battery system or even another DC power plant. After receiving the charging signal, the processor 222 may employ the sensed current to adjust the DC output to provide a charging current to the battery system. The DC output may be adjusted to provide a permitted charging current. The permitted charging current may be equivalent to a reserve current capacity of the DC power plant. In some embodiments, a predetermined limit may be employed to determine the permitted charging current. The processor 222 may be configured to calculate the permitted charging current and the reserve current capacity. The predetermined limit may be set based on the type and/or model of the DC power plant 200. A priority that is set based on a load the DC power plant 200 serves may also be employed to determine the permitted charging current.

Figure 3:
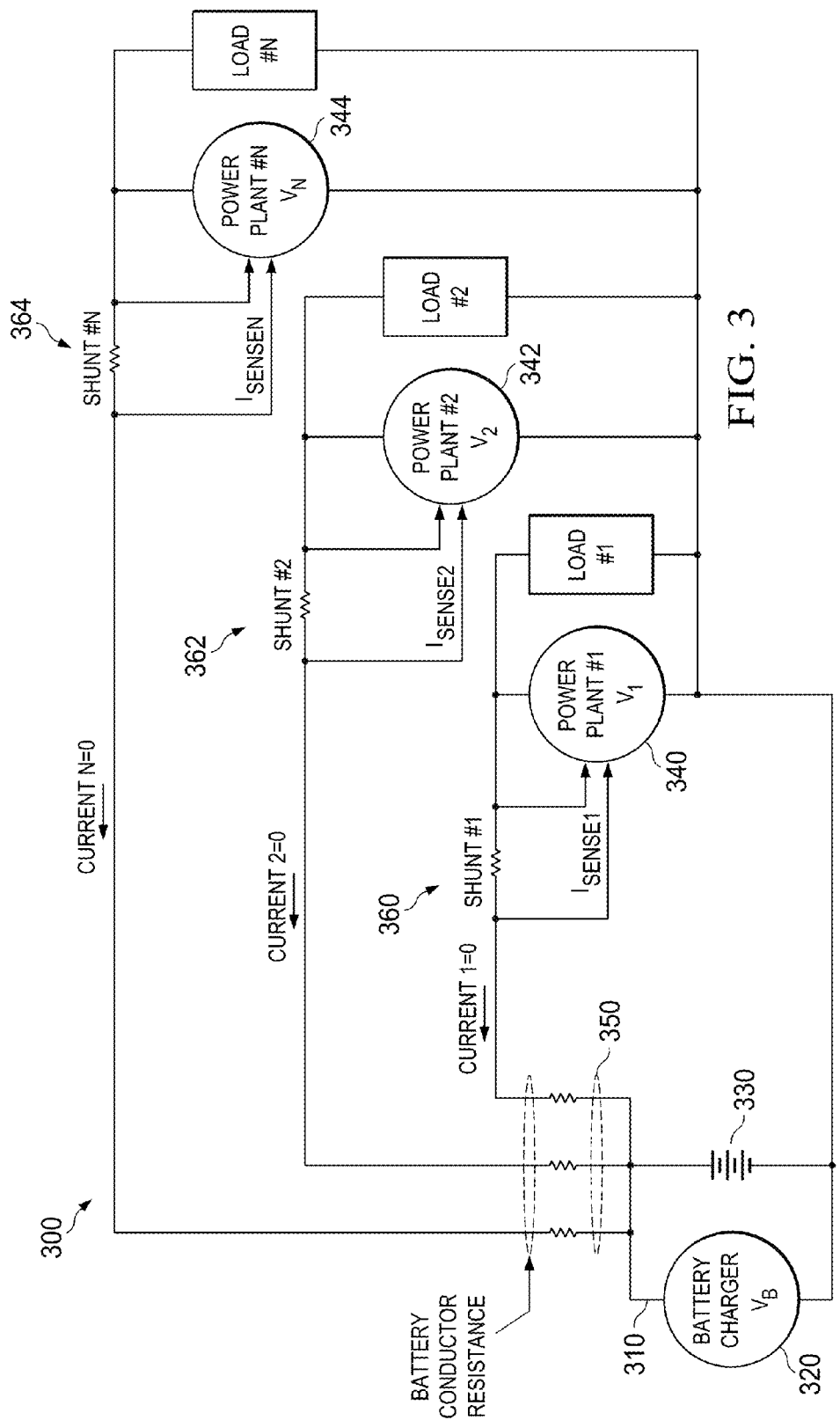
FIG. 3 illustrates a schematic diagram of an embodiment of a DC power system constructed according to the principles of the disclosure.

FIG. 3 illustrates a schematic diagram of an embodiment of a DC power system 300 constructed according to the principles of the disclosure. The schematic diagram of FIG. 3 illustrates how currents may be sensed to zero out battery current on the battery distribution conductors between DC power plants and centrally located battery systems during normal operation. The DC power system includes a DC power bus 310, a battery charger 320, a battery system 330, three DC power plants 340, 342, 344, battery distribution conductors 350 connecting the DC power plants 340, 342, 344, to the DC power bus 310 and three resistance current shunts 360, 362 and 364. The resistance current shunts 360, 362, 364, allow currents to be sensed in each battery distribution conductor. Employing the resistance current shunts 360, 362, 364, also allows a calibrated reading of the battery current on the battery distribution conductors 350. The DC power plants 340, 342, 344, receive the sensed currents and determine the voltage on either side of the current shunt resistance. The DC power plants 340, 342, 344, (i.e., the controller thereof) then dynamically determine the voltage needed on the power plant side of the resistance current shunts 360, 362, 364, for the voltages on either side of the current shunt resistance to match or at least substantially match. The DC power plants 340, 342, 344, then dynamically adjust the DC voltage and, therefore, substantially reduce the battery current on the battery distribution conductors 350 to obtain or at least substantially approach zero amperes. As noted above, the resistance current shunts 360, 362, 364, allow a calibrated reading of the battery currents. However, in some embodiments, when a calibrated reading of the battery currents is not needed, the resistance current shunts 360, 362, 364, can be eliminated and the resistance of the battery distribution conductors themselves can be used.

Figure 4:
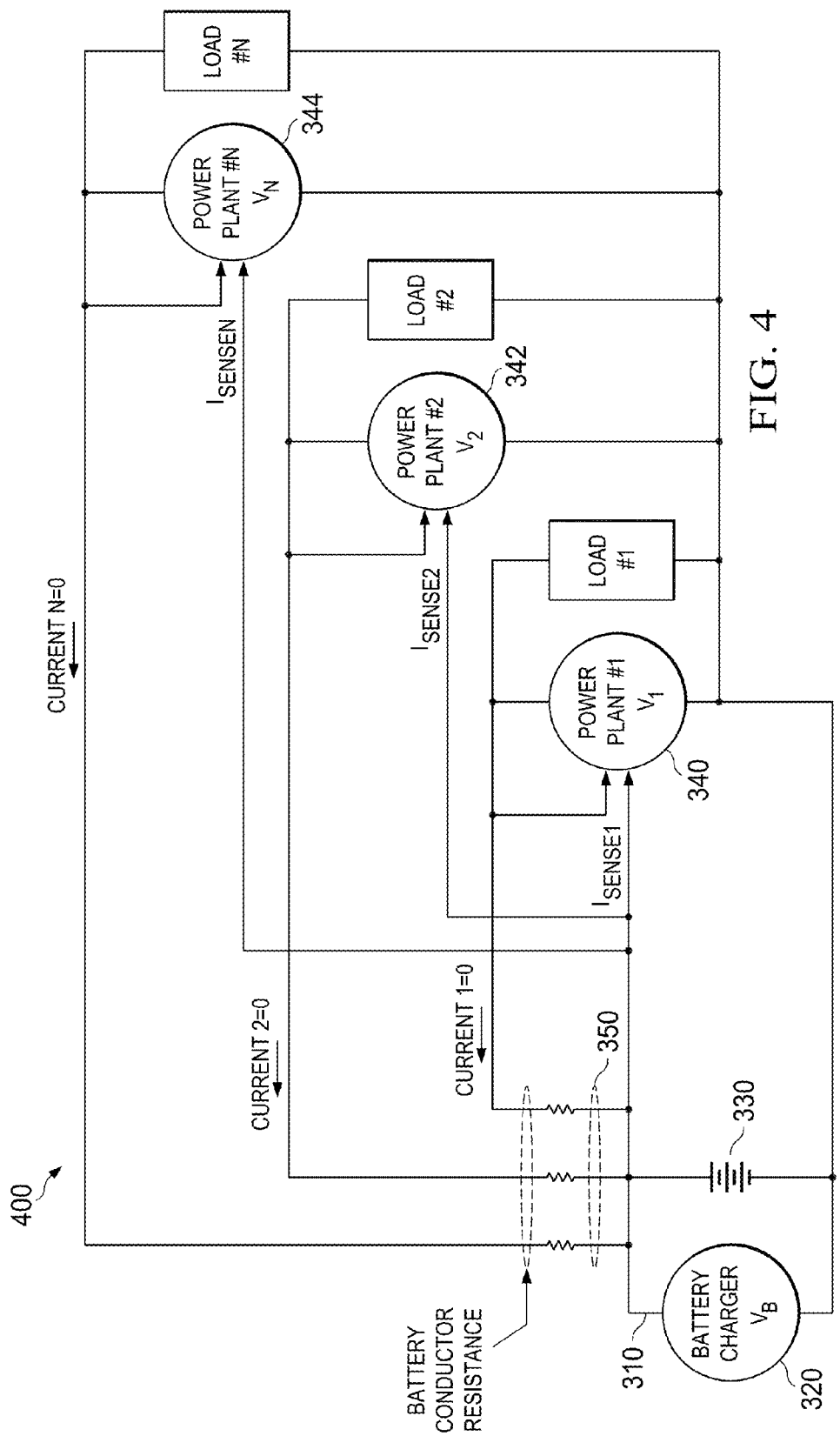
FIG. 4 illustrates a schematic diagram of another embodiment of a DC power system constructed according to the principles of the disclosure.

FIG. 4 illustrates a schematic diagram of an embodiment of a DC power system 400 constructed according to the principles of the disclosure that uses the resistance of the battery distribution conductors instead of resistance current shunts for zeroing-out current on the battery distribution conductors. The DC power system 100 illustrated in FIG. 1 may be configured as the DC power system 300 or the DC power system 400 for reducing the battery current on the battery distribution conductors. As illustrated, the DC power system 400 does not include resistance current shunts. Instead, the DC power plants 340, 342, 344, employ the resistance of the battery distribution conductors 350 to determine how to dynamically adjust the DC voltage output to reduce the battery current to zero. In this embodiment, the value of the resistance is not relevant since the control circuit (i.e., processor of the controller) in the DC power plants 340, 342, 344, is being used to force the current to zero instead of to a calibrated value as done when using a resistance current shunt.

Figure 5:
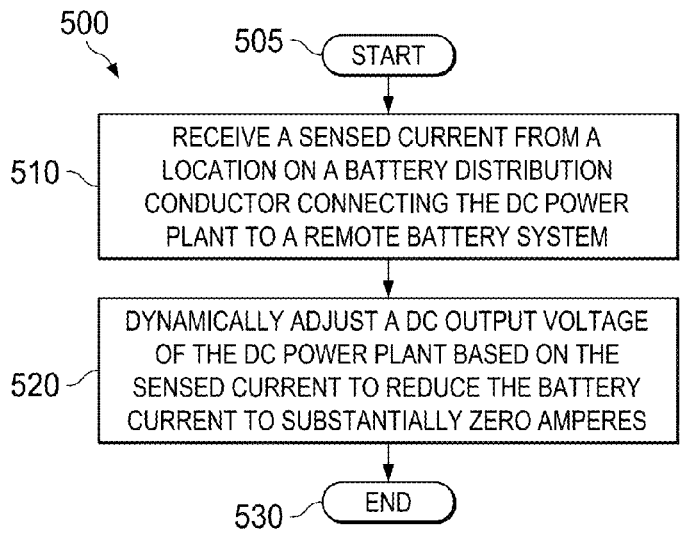
FIG. 5 illustrates a flow diagram of an embodiment of a method of reducing a battery current carried out according to the principles of the disclosure.

FIG. 5 illustrates a flow diagram of an embodiment of a method 500 of reducing a distal battery current carried out according to the principles of the disclosure. The method 500 may be carried out by a DC power plant located proximate with a load to prevent battery current from the DC power plant to a remote battery system during normal operation. A controller of a DC power plant including a processor may include the necessary circuitry and sequence of operating instructions to perform the method 500. The processor may be directed by the stored sequence of operating instructions to perform the method 500 or at least a portion thereof when the sequence is initiated. The method 500 begins in a step 505.

In a step 510, a sensed current is received from a location on a battery distribution conductor connecting the DC power plant to a remote battery system. The remote battery system is a centrally located battery system that is distal from the DC power plant and the load or loads proximate the DC power plant. The sensed current may be received from a resistance current shunt associated with the battery distribution conductor. In one embodiment, the location may be on the DC power plant side of the resistance current shunt. In some embodiments, resistance of the battery distribution conductor may be used to distinguish between the sensed currents. In a step 520, a DC output voltage of the DC power plant is dynamically adjusted based on the sensed current to reduce the distal battery current to substantially zero amperes. Whether employing a resistance current shunt or employing the resistance of battery distribution conductors, dynamically adjusting includes matching voltages on either side of the resistance as determined from the sensed current to reduce the battery current to zero. As such, the DC output voltage of the DC power plant is dynamically adjusted to match the voltage on the other side of the resistance. The method 500 then ends in a step 530.

Figure 6:
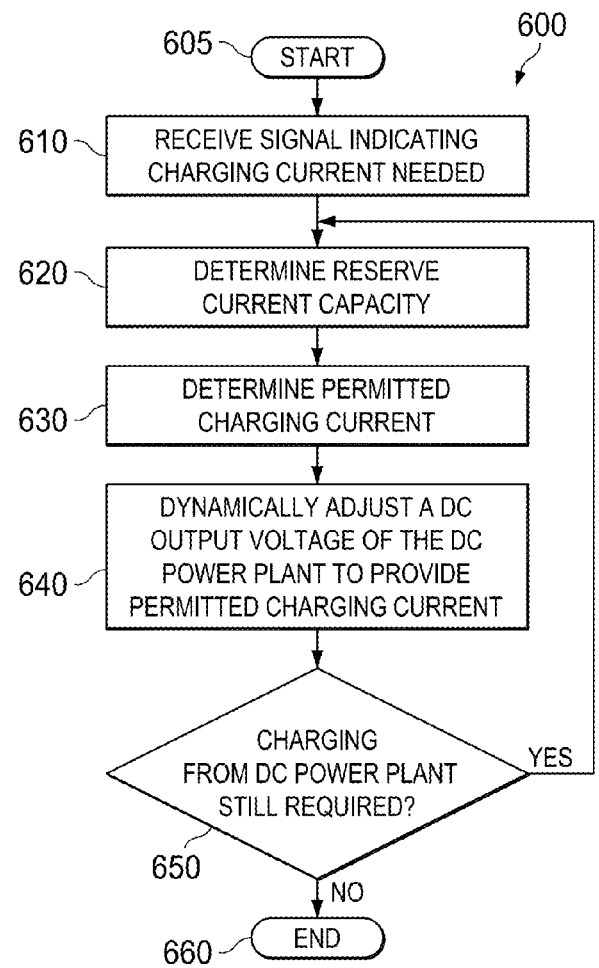
FIG. 6 illustrates a flow diagram of an embodiment of a method of providing charging current to a battery from a distal DC power plant carried out according to the principles of the disclosure.

FIG. 6 illustrates a flow diagram of an embodiment of a method 600 of providing battery charging current from a DC power plant to a remote battery system carried out according to the principles of the disclosure. The method 600 may be carried out by a DC power plant located proximate with a load to provide battery charging current from the DC power plant to the remote battery system during a battery recharge operation. The battery system may be centrally located as part of a DC power system that includes the distally located DC power plant. In one embodiment, the DC power system may have a hybrid architecture. A controller may include the necessary circuitry and sequence of operating instructions to perform the method 600. The controller may include a processor that is directed by the stored sequence of operating instructions to perform the method 600 or at least a portion thereof when the sequence is initiated by, for example, the processor. The controller may be a system controller for the DC power system or may be a controller of a DC power plant. In one embodiment, various controllers of the DC power system may cooperate to perform the functions of the method 600. For example, a system controller may cooperate with controllers of DC power plants or different DC power plant controllers may communicate there between to perform the steps of the method 600. The method 600 begins in a step 605.

In a step 610, a signal is received at a distal DC power plant indicating charging current is needed for a remote battery system. The signal may be received by a controller of the DC power plant. A communications interface may receive the signal for the controller. In one embodiment, the signal may be generated by a system controller for a DC power system. In another embodiment, the signal may be generated by a controller of another DC power plant. A battery charger of the DC power system may also provide the signal. In one embodiment, the signal may be the battery voltage or a representative thereof.

In a step 620, reserve current capacity for the DC power plant is determined. To determine the reserve current capacity, load current provided by the DC power plant may first be determined and subtracted from the overall current capacity of the DC power plant. The load current may be sensed using conventional means and reported to the controller of the DC power plant. The controller of the DC power plant can then employ the sensed load current to determine the reserve current capacity for the DC power plant.

In a step 630, a permitted charging current for the DC power plant is determined. The controller of the DC power plant may determine the permitted charging current based on the load current and the total capacity of the DC power plant. In some embodiments, the permitted charging current may be equivalent to the reserve current capacity. In other embodiments, a predetermined limit may be used to determine the permitted charging current. As such, all of the reserve current capacity in the DC power plant may not be allocated for the charging current. Instead, the predetermined limit may be used to insure a desired amount of capacity is available. For example, an amount of the reserve charging capacity may be retained to account for load variations. Accordingly, in one embodiment, the permitted charging current may be the difference between the predetermined limit and the reserve charging capacity. The predetermined limit may be programmed in advance and set (e.g., manually entered) by an operator of the DC power system.

In a step 640, a DC output voltage of the DC power plant is dynamically adjusted to provide the determined permitted charging current. The DC output voltage may be dynamically adjusted based on a sensed current in a battery distribution conductor coupled to the DC power plant and the remote battery system. The permitted charging current may also be modified based on a specific battery type or model of the battery system. A controller for the DC power system may include the battery information for the battery system or may be supplied by the operator of the DC power system. Whether employing a resistance current shunt or employing battery distribution conductor resistance, dynamically adjusting includes sensing the voltages on either side of the resistance as determined from the sensed current to produce the required charging current as determined in step 630.

In a determining step 650, a determination is made to continue providing the permitted charging current. The determination may be based on if charging of the battery system is still required. In another embodiment, the determination may be based on a change in condition of the DC power plant or another DC power plant. For example, another DC power plant may become available and is better suited for providing charging current than the existing DC power plant. If the determination is yes, then the method 600 returns to step 620. If the determination is no, then the method 600 ends in a step 660. The determination may be based on when, for example, the battery system is charged. The no determination may also be based on receipt of a control signal to indicate recharging assistance from the DC power plant is no longer needed. The recharged signal may be generated by a system controller or may be generated by a controller from a DC power plant. The no determination may also be based on when the sensed battery voltage has reached its desired voltage.

As such, the disclosure provides a method of providing additional charging capability of a remote battery system from a distally located DC power plant. The method can include receiving an indication that battery charging current is required from the distal DC power plant, sensing the load current of the DC power plant and the reserve current capability thereof and dynamically adjusting the DC output voltage of the DC power plant to provide charging current to the remote battery system. The charging current provided by the DC power plant may be based on the reserve current capability of the DC power plant, the sensed current in the battery distribution conductor connecting the DC power plant to the remote battery system and the battery type and model of the remote battery system. A controller of a DC power system may be employed to perform at least some of the steps of the method.

The present disclosure provides a DC power plant architecture that employs cost efficient battery technology with the DC efficiency obtained by co-locating the DC power plants with the load equipment. Additionally, the DC power plants are configured to reduce current on the battery distribution conductors to ideally zero amperes during normal operation. Furthermore, a dedicated battery charger is provided to allow easier optimization of the charging current. Additionally, the DC power plants may be configured to provide additional charging current to the battery system. Thus, even with a distal DC power plant located remotely from the battery system, the DC power plant or plants may be used to provide charging current for the battery system. A system controller may determine additional charging current is needed. Additionally, a controller of a DC power plant may also determine additional charging current is needed. The determination may be based on the occurrence of an event. For example, a controller may request a more rapid recharging of the battery system that is beyond the capability of a dedicated charger. Additionally, the additional charging current may be requested if the dedicated charger fails and cannot recharge the batteries.

The disclosed architecture of the DC power system also allows for the DC power plants to be placed in load cabinets. Thus, the DC power plant 200 may be located in a cabinet with the load to further reduce DC distribution losses. While this may be used for new installations, the disclosed architecture can also be implemented with existing centralized architectures without significant changes to distribution and load wiring. Accordingly, installation costs and potential service interruptions can be minimized.

The above-described apparatuses and methods may be embodied in or performed by various digital data processors or computers, wherein the computers are programmed or store executable programs of sequences of software instructions to perform one or more of the steps of the methods e.g., steps of the methods or processes of FIGS. 5-6. The software instructions of such programs may represent algorithms and be encoded in machine-executable form on conventional digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods. Accordingly, computer storage products with a computer-readable medium, such as a non-transitory computer-readable medium, that have program code thereon for performing various computer-implemented operations that embody the tools or carry out the steps of the methods set forth herein may be employed. A non-transitory media includes all computer-readable media except for a transitory, propagating signal. The media and program code may be specially designed and constructed for the purposes of the disclosure, or they may be of the kind well known and available to those having skill in the computer software arts. An apparatus, such as a DC power plant, may be designed to include the necessary circuitry or series of operating instructions to perform each step of the disclosed methods. In one embodiment, the particular functions described herein may be integrated within a processor (including an associated memory thereof) of a DC power plant controller, a system controller or a battery charging plant controller.

Those skilled in the art to which the invention relates will appreciate that other and further additions, deletions, substitutions and modifications may be made to the described embodiments without departing from the scope of the invention.

What is claimed is:

1. A DC power plant for supplying power to a load, said DC power plant comprising:
   a rectifier system including an AC power input and a DC power output, said rectifier system configured to receive an AC input voltage at said AC power input and produce a DC output voltage at said DC power output; and
   a controller configured to determine a permitted charging current for a battery system coupled to said rectifier system and dynamically adjust said DC output voltage to provide said permitted charging current for said battery system, wherein said permitted charging current is determined based on a load current of said power plant and an overall current capacity of said power plant, wherein said DC power plant is located proximate the load to reduce DC losses and is located remotely from said battery system, and wherein said permitted charging current is configured to reduce DC losses between said DC power plant and said battery system.

2. The power plant as recited in claim 1 wherein said battery system is coupled to said rectifier system via a battery distribution conductor and said permitted charging current is provided on said battery distribution conductor.

3. The power plant as recited in claim 2 wherein said controller is further configured to dynamically adjust said DC output voltage to provide said permitted charging current based on sensed current in said battery distribution conductor, said controller including a current sensing interface configured to receive said sensed current.

4. The power plant as recited in claim 1 wherein said controller is further configured to determine a reserve current capacity for said power plant.

5. The power plant as recited in claim 4 wherein said controller is further configured to determine said reserve current capacity by subtracting the load current of said power plant from the overall current capacity of said power plant.

6. The power plant as recited in claim 4 wherein said permitted charging current is equivalent to said reserve current capacity.

7. The power plant as recited in claim 1 wherein said controller is configured to determine said permitted charging current based on a predetermined limit.

8. The power plant as recited in claim 1 wherein said controller is further configured to receive a signal indicating said charging current is needed for said battery system.

9. The power plant as recited in claim 1 wherein said controller is further configured to provide said permitted charging current based on a type of said battery system.

10. A DC power system for supplying power to a load, said DC power system comprising:
    a DC power bus;
    a battery system coupled to said DC power bus;
    primary DC distribution interrupting devices coupled to said DC power bus;
    a power plant coupled to said DC power bus through said primary DC distribution interrupting devices, said power plant located remotely from said DC power bus and said battery system; and
    a controller configured to receive an indication said battery system needs charging current and direct said power plant to provide at least a portion of said charging current based on a permitted charging current of said power plant, wherein said permitted charging current is determined based on a load current of said at least one power plant and an overall current capacity of said at least one power plant, wherein said power plant is located proximate the load to reduce DC losses and is located remotely from said battery system, and wherein said permitted charging current is configured to reduce DC losses between said power plant and said battery system.

11. The DC power system as recited in claim 10 wherein said power plant is coupled to said primary DC distribution interrupting devices via battery distribution conductors.

12. The DC power system as recited in claim 10 wherein said controller is a power plant controller of said power plant.

13. The DC power system as recited in claim 10 further comprising multiple DC power plants coupled to said DC power bus via said primary DC distribution interrupting devices.

14. The DC power system as recited in claim 13 wherein said controller is configured to direct more than one of said multiple DC power plants to provide portions of said charging current.

15. A method of charging a remote battery system, comprising:
receiving at a DC power plant a signal indicating charging current is needed for a battery system;
determining a permitted charging current for said DC power plant; and
providing at least part of said charging current to said battery system from said permitted charging current, wherein said permitted charging current is determined based on a load current of said power plant and an overall current capacity of said power plant, wherein said DC power plant is located proximate to a load to reduce DC losses and located remotely from said battery system, and wherein said permitted charging current is configured to reduce DC losses between said DC power plant and said remotely located battery system.

16. The method as recited in claim 15 further comprising determining a reserve current capacity for said DC power plant and determining said permitted charging current based thereon.

17. The method as recited in claim 15 wherein said determining said permitted charging current is based on a predetermined limit.

18. The method as recited in claim 15 further comprising receiving at an additional DC power plant a signal indicating said charging current is needed and determining an additional permitted charging current for said additional DC power plant.

19. The method as recited in claim 18 further comprising providing at least another portion of said charging current from said additional permitted charging current.

20. A battery charging controller, comprising:
an interface configured to receive a signal indicating a need for charging current for a battery system; and
a processor configured to direct at least one power plant located remotely from said battery system to provide at least a portion of said charging current based on a permitted charging current of said at least one power plant, wherein said permitted charging current is set based on a load current of said at least one power plant and an overall current capacity of said at least one power plant, wherein said power plant is located proximate to a load to reduce DC losses and located remotely from said battery system, and wherein said permitted charging current is configured to reduce DC losses between said power plant and said remotely located battery system.

* * * * *